United States Patent
Dunaway (10) Patent No.: US 12,451,678 B2
(45) Date of Patent: Oct. 21, 2025

(54) JUNCTION BOX ASSEMBLY FOR A DOMESTIC APPLIANCE

(71) Applicant: Haier US Appliance Solutions, Inc., Wilmington, DE (US)

(72) Inventor: Logan Chayse Dunaway, Greenville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/604,006

(22) Filed: Mar. 13, 2024

(65) Prior Publication Data

US 2025/0293496 A1 Sep. 18, 2025

(51) Int. Cl.
*H02G 3/08* (2006.01)
*A47L 15/42* (2006.01)

(52) U.S. Cl.
CPC .......... *H02G 3/081* (2013.01); *A47L 15/4274* (2013.01)

(58) Field of Classification Search
CPC ...................................................... H02G 3/081
See application file for complete search history.

(56) References Cited

U.S. PATENT DOCUMENTS

| | | | |
|---|---|---|---|
| 3,692,377 A * | 9/1972 | Hancock | A47B 81/00 312/223.4 |
| 3,862,786 A * | 1/1975 | Brezosky | A47L 15/427 312/228 |
| 6,200,155 B1 * | 3/2001 | Chudkosky | H01R 31/06 174/53 |
| 8,486,202 B2 * | 7/2013 | Haltmayer | A47L 15/4274 312/228 |
| 9,655,497 B2 | 5/2017 | Lindgren et al. | |
| 9,960,582 B2 | 5/2018 | Crawford, Jr. | |
| 10,439,343 B2 * | 10/2019 | Sakal | H01R 31/06 |
| 11,109,738 B2 | 9/2021 | Kretz et al. | |
| 11,901,712 B1 * | 2/2024 | Athani | H01R 13/055 |
| 2018/0192849 A1 * | 7/2018 | O'Brien | A47L 15/4253 |
| 2019/0393642 A1 * | 12/2019 | Wagner | H01R 13/506 |
| 2020/0076143 A1 * | 3/2020 | Reese | H01R 25/006 |
| 2021/0242622 A1 * | 8/2021 | Rende | H01R 13/6675 |

FOREIGN PATENT DOCUMENTS

CN 110707628 A 1/2020

* cited by examiner

*Primary Examiner* — Hung V Ngo
(74) *Attorney, Agent, or Firm* — Dority & Manning, P.A.

(57) ABSTRACT

A domestic appliance includes a frame including at least one frame member; a bracket attached to the at least one frame member, the bracket defining a front planar surface; a first retention feature protruding from the front planar surface of the bracket, the first retention feature forming a first receiving space; a second retention feature protruding from the front planar surface of the bracket and spaced apart from the first retention feature, the second retention feature forming a second receiving space; and a box selectively coupled to the bracket, the box including a first tab and a second tab, wherein the first tab is selectively received within the first retention feature and the second tab is selectively received within the second retention feature.

18 Claims, 4 Drawing Sheets

JUNCTION BOX ASSEMBLY FOR A DOMESTIC APPLIANCE

FIELD OF THE INVENTION

The present subject matter relates generally to domestic appliances, and more particularly to junction boxes and assemblies thereof for domestic appliances.

BACKGROUND OF THE INVENTION

Common household appliances, such as dishwasher appliances, include one or more elements or electronics elements that accept user inputs, perform actions (such as cleaning actions), or the like. Such elements typically require electricity to perform such actions. Accordingly, the household appliance may be electrically connected with an outlet to receive electricity or power therefrom. A junction box may be provided to cover certain electrical connection components, such as power cords. The junction box may be positioned at inconvenient places, such as a bottom of the appliance (e.g., a bottom front of the appliance).

Currently, attachment and assembly of such junction boxes suffer setbacks. As mentioned, it can be inconvenient for an installer, a technician, or a user to access the area at which the junction box is located. Thus, attaching the junction box to the appliance requires advanced dexterity to manipulate the box and a fastener together. Moreover, such boxes may require multiple fasteners, resulting in additional time expenditure and effort. Further still, current junction boxes lack sufficient locating features to properly align and assemble the box to the appliance.

Accordingly, a domestic appliance with a junction box assembly that obviates one or more of the above-mentioned drawbacks would be beneficial. In particular, a junction box assembly with self-locating features would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a domestic appliance is provided. The domestic appliance may include a frame including at least one frame member; a bracket attached to the at least one frame member, the bracket defining a front planar surface; a first retention feature protruding from the front planar surface of the bracket, the first retention feature forming a first receiving space; a second retention feature protruding from the front planar surface of the bracket and spaced apart from the first retention feature, the second retention feature forming a second receiving space; and a box selectively coupled to the bracket, the box including a first tab and a second tab, wherein the first tab is selectively received within the first retention feature and the second tab is selectively received within the second retention feature.

In another exemplary aspect of the present disclosure, a junction box assembly for a domestic appliance is provided. The junction box assembly may include a bracket defining a front planar surface; a first retention feature protruding from the front planar surface of the bracket, the first retention feature forming a first receiving space; a second retention feature protruding from the front planar surface of the bracket and spaced apart from the first retention feature, the second retention feature forming a second receiving space; and a junction box selectively coupled to the bracket, the junction box comprising a first tab and a second tab, wherein the first tab is selectively received within the first retention feature and the second tab is selectively received within the second retention feature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
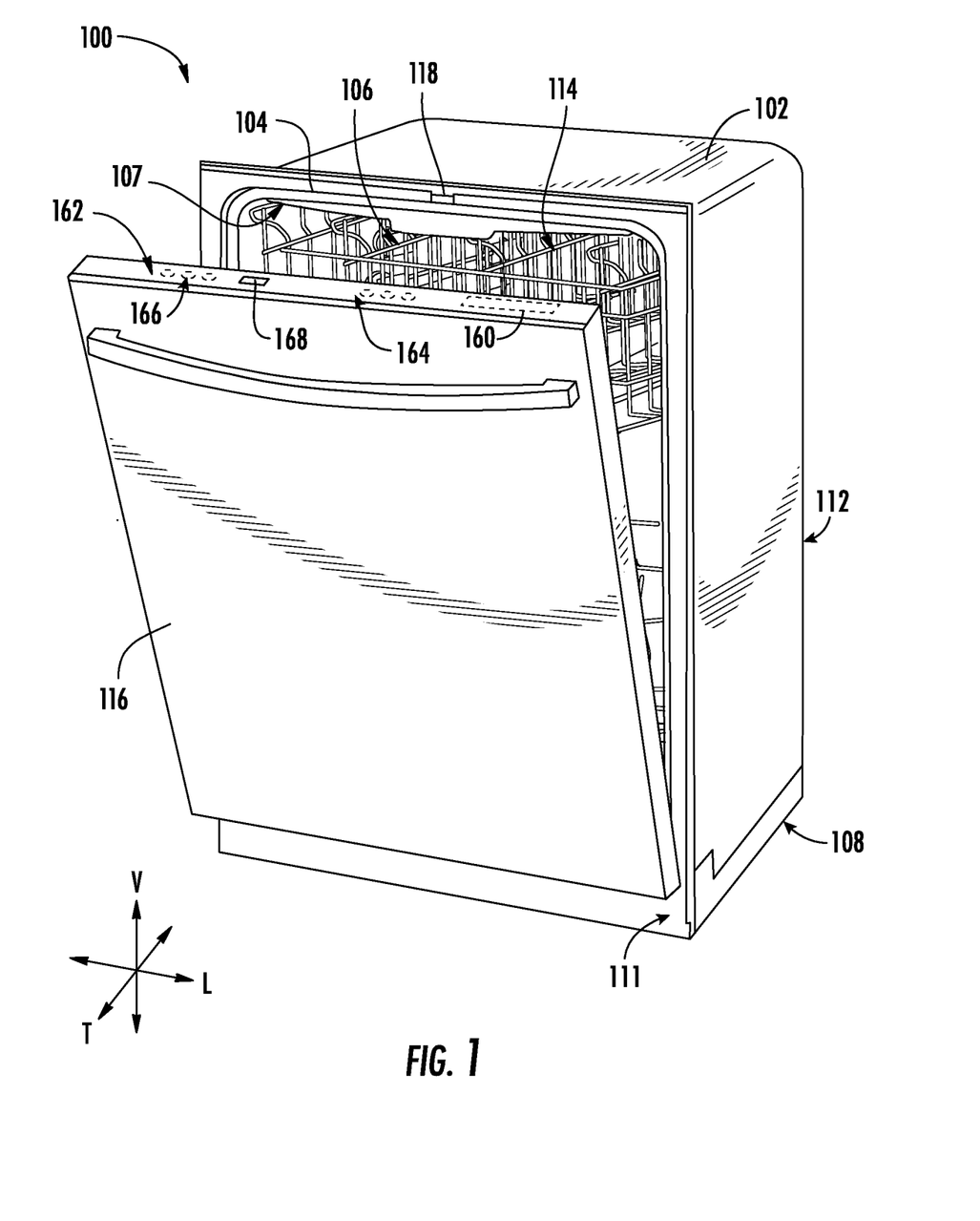
FIG. 1 provides a perspective view of a dishwasher appliance, including a dishwasher door according to exemplary embodiments of the present disclosure.
Figure 2:
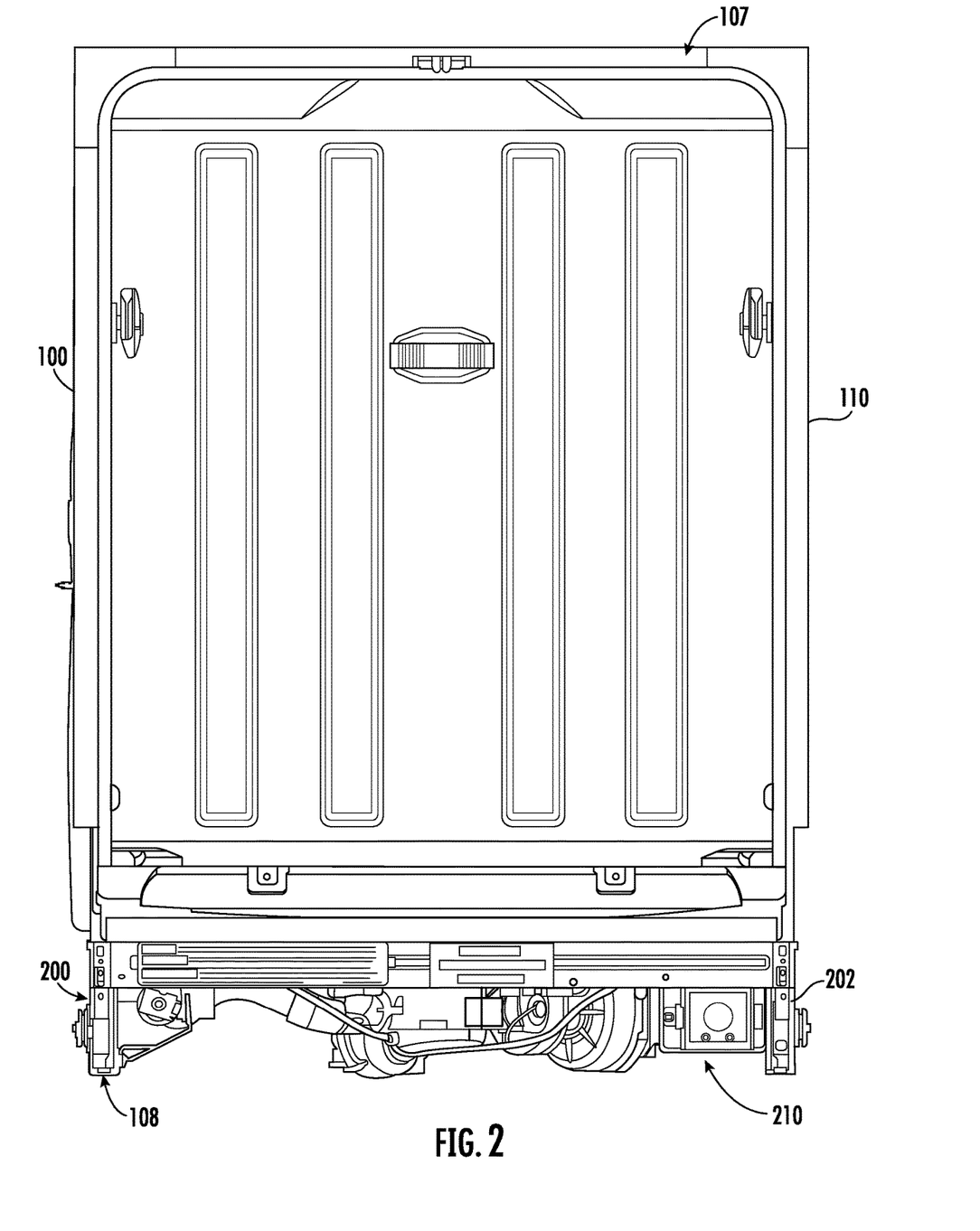
FIG. 2 provides a front view of the exemplary dishwasher appliance of FIG. 1 with the door removed.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 having a tub 104 therein that defines a wash chamber 106. As shown, Cabinet 102 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually orthogonal to one another.

The tub 104 includes a front opening 114 and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. According to exemplary embodiments, dishwasher 100 further includes a door closure mechanism or assembly 118 that is used to lock and unlock door 116 for accessing and sealing wash chamber 106.

The dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 160 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116, as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel 164 through which a user may select various operational features and modes and monitor progress of the dishwasher 100. In one embodiment, the user interface 164 may represent a general purpose I/O ("GPIO") device or functional block. In certain embodiments, the user interface 164 includes input components 166, such as one or more of a variety of electrical, mechanical or electro-mechanical input devices including rotary dials, push buttons, and touch pads. The user interface 164 may further include one or more display components 168, such as a digital display device or one or more indicator light assemblies designed to provide operational feedback to a user. The user interface 164 may be in communication with the controller 160 via one or more signal lines or shared communication busses.

Figure 4:
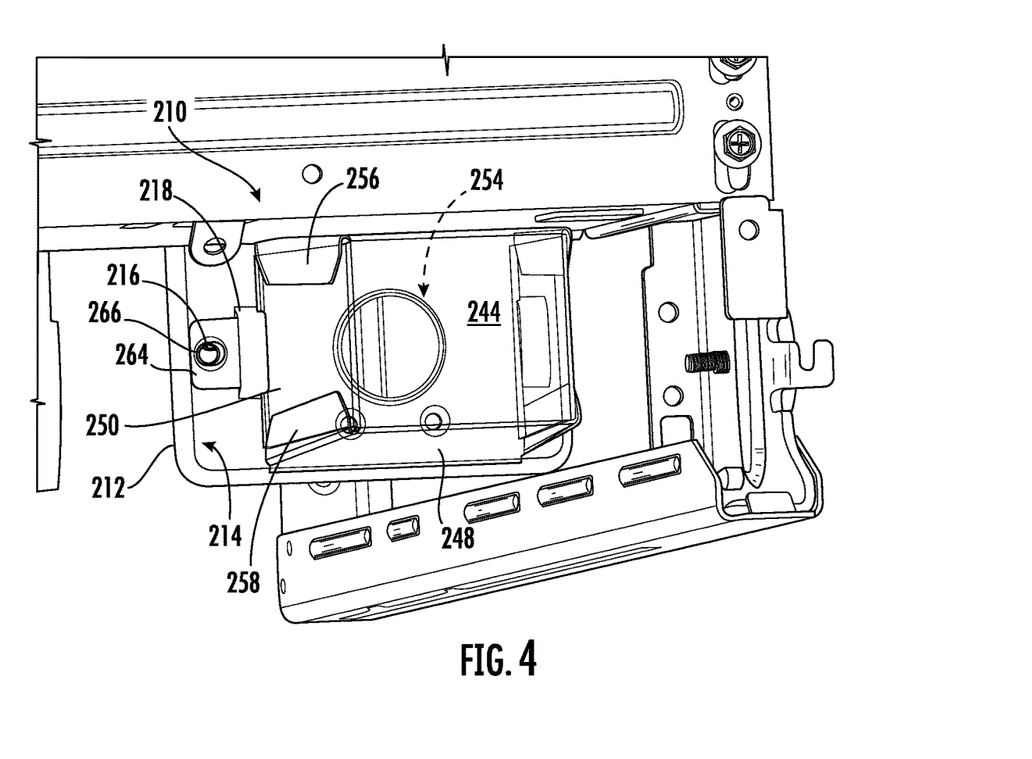
FIG. 4 provides a front perspective view of the exemplary junction box assembly of FIG. 3.

FIG. 2 shows a front view of appliance 100. For instance, door 116 is removed from FIG. 2 to show an interior of wash chamber 106. Moreover, a bottom front plate or kick plate is removed to show a space below tub 104. As shown, appliance 100 may include a frame 200. Frame 200 may include at least one frame member 202. Referring briefly to FIG. 4, the at least one frame member 202 may extend along either of the vertical direction V or the transverse direction T. However, frame 200 may include a plurality of frame members 202 extending in each direction (e.g., vertical V, lateral L, transverse T, etc.). Frame member 202 may include a metallic or rigid member capable of providing support, stability, or rigidity to appliance 100, as would be expected.

It should be appreciated that the invention is not limited to any particular style, model, or configuration of dishwasher 100. The exemplary embodiment depicted in FIGS. 1 and 2 is for illustrative purposes only. For example, aspects of the present subject matter may be applied to other appliances (e.g., domestic appliances) as well, such as refrigerators, ovens, microwaves, etc. Accordingly, dishwasher 100 is provided by way of example only.

Figure 3:
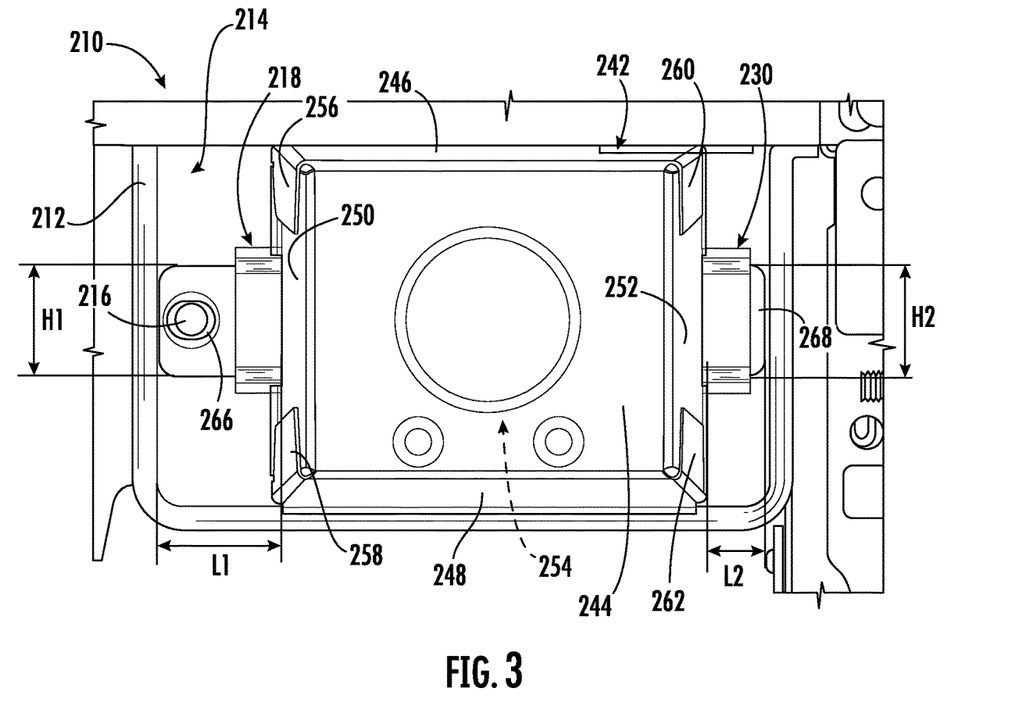
FIG. 3 provides a close-up front view of a junction box assembly according to exemplary embodiments of the present disclosure.

Appliance 100 may include a junction box assembly 210. For instance, FIGS. 3 and 4 provide closeup views of junction box assembly 210. Junction box assembly 210 may be provided as a separate assembly attached to appliance 100 (e.g., at frame 200). In some embodiments, at least a portion of junction box assembly 210 is integrally provided with appliance 100 (e.g., as part of frame 200 or frame member 202). Junction box assembly 210 may be configured to contain one or more electrical components therein. For instance, a power cord (not shown) for transferring power to, e.g., user interface 164, input components 166, display components 168, etc., may have a portion thereof contained within junction box assembly 210.

Referring now to FIGS. 3 and 4, junction box assembly 210 will be described in detail. Junction box assembly 210 may include a bracket 212. Bracket 212 may be attached to frame member 202 (e.g., via one or more fasteners). For instance, bracket 212 may protrude from frame member 202 (e.g., along the vertical direction V, the lateral direction L, etc.). In additional or alternative embodiments, bracket 212 is formed as a portion of cabinet 102. In still further embodiments, bracket 212 is attached to cabinet 102 (e.g., via one or more fasteners).

Bracket 212 may include a rigid or semi-rigid material. Additionally or alternatively, bracket 212 may include one or more coatings, such as fire proof coatings. Bracket 212 may define a front planar surface 214. For instance, front planar surface 214 may face toward a front of appliance 100. However, the orientation of front planar surface 214 may vary according to specific embodiments, and the description given herein is provided by way of example only. Bracket 212 may include one or more through holes (e.g., along the transverse direction T). The one or more electrical components may penetrate through bracket 212 via the one or more through holes. Additionally or alternatively, a screw hole 216 may be formed through bracket 212 such that a fastener may be inserted therethrough.

Figure 5:
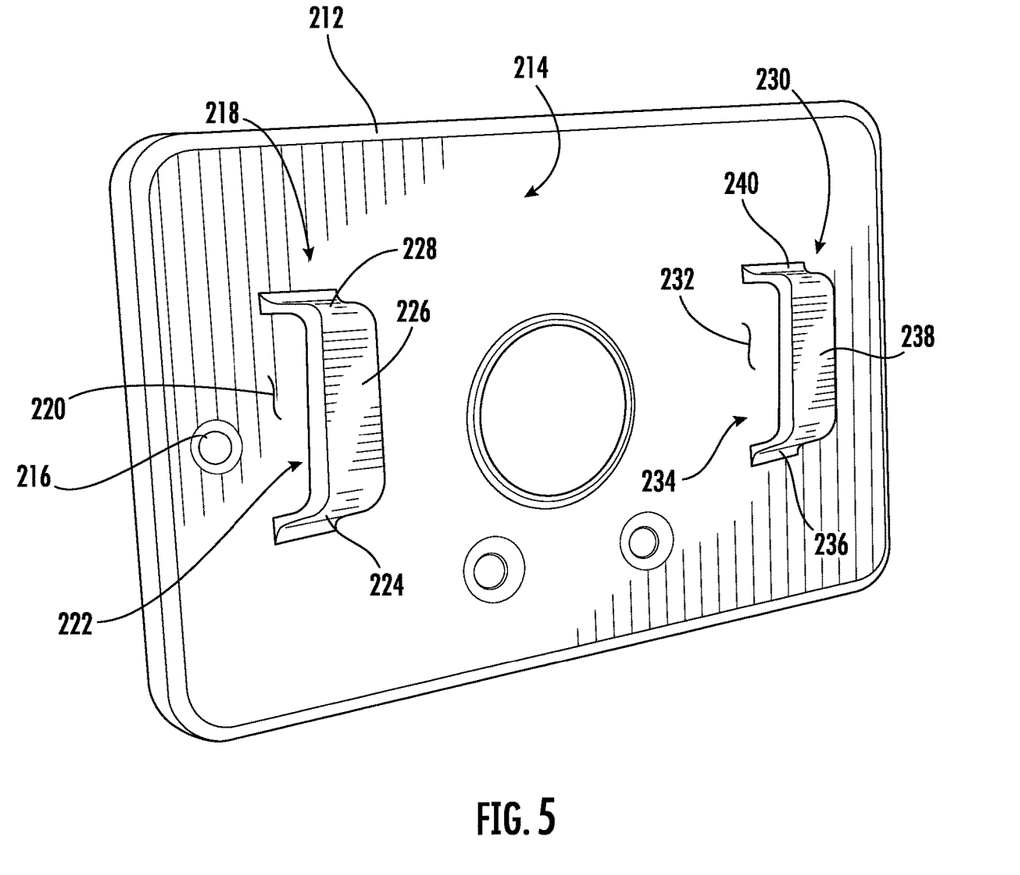
FIG. 5 provides a front perspective view of a bracket of the exemplary junction box assembly of FIG. 3.

Referring briefly to FIG. 5, bracket 212 may include a first retention feature 218. In detail, first retention feature 218 may protrude from front planar surface 214 of bracket 212 (e.g., forward along the transverse direction T). First retention feature 218 may form a first receiving space 220. For instance, first receiving space 220 may be defined between first retention feature 218 and front planar surface 214. Accordingly, first retention feature 218 may include a loop (e.g., a first loop) 222. In some instances, first retention feature 218 includes a first arm 224 extending from front planar surface 214. First arm 224 may extend predominantly perpendicular (or normal) to front planar surface 214. For instance, when front planar surface 214 is defined within a plane along the vertical direction V and the lateral direction L, first arm 224 may protrude along the transverse direction T (e.g., rearward from appliance 100).

First retention feature 218 may include a second arm 226. Second arm 226 may extend from first arm 224. For instance, second arm 226 may extend from a distal end of first arm 224. Second arm 226 may be predominantly parallel with front planar surface 214 of bracket 212. Accordingly, first receiving space 220 may be formed between second arm 226 and front planar surface 214. According to some embodiments, second arm 226 extends upward along the vertical direction V from the distal end of first arm 224. Second arm 226 may have a length (e.g., vertical length) that is between about 2 times and about 5 times a length of first arm 224 (e.g., along the transverse direction T).

According to some embodiments, first retention feature 218 includes a third arm 228. Third arm 228 may be predominantly parallel with first arm 224. For instance, third arm 228 may connected a distal end of second arm 226 with front planar surface 214. Thus, first receiving space 220 may be defined between second arm 226 and front planar surface 214 along the transverse direction T, and between first arm 224 and third arm 228 along the vertical direction V. However, according to some embodiments, third arm 228 may be omitted. For instance, second arm 226 may be a cantilevered member having a free end opposite first arm 224.

Referring still to FIG. 5, bracket 212 may include a second retention feature 230. In detail, second retention feature 230 may protrude from front planar surface 214 of bracket 212 (e.g., rearward along the transverse direction T). Second retention feature 230 may form a second receiving space 232. For instance, second receiving space 232 may be defined between second retention feature 230 and front planar surface 214. Accordingly, second retention feature 230 may include a loop (e.g., a second loop) 234. In some instances, second retention feature 230 includes a first arm 236 extending from front planar surface 214. First arm 236 may extend predominantly perpendicular (or normal) to front planar surface 214. For instance, when front planar surface 214 is defined within a plane along the vertical direction V and the lateral direction L, first arm 236 may protrude along the transverse direction T (e.g., rearward from appliance 100).

Second retention feature 230 may include a second arm 238. Second arm 238 may extend from first arm 236. For instance, second arm 238 may extend from a distal end of first arm 236. Second arm 238 may be predominantly parallel with front planar surface 214 of bracket 212. Accordingly, second receiving space 232 may be formed between second arm 238 and front planar surface 214. According to some embodiments, second arm 238 extends upward along the vertical direction V from the distal end of first arm 236. Second arm 238 may have a length (e.g., vertical length) that is between about 2 times and about 5 times a length of first arm 236 (e.g., along the transverse direction T).

According to some embodiments, second retention feature 230 includes a third arm 240. Third arm 240 may be predominantly parallel with first arm 236. For instance, third arm 240 may connected a distal end of second arm 238 with front planar surface 214. Thus, second receiving space 232 may be defined between second arm 238 and front planar surface 214 along the transverse direction T, and between first arm 236 and third arm 240 along the vertical direction V. However, according to some embodiments, third arm 240 may be omitted. For instance, second arm 238 may be a cantilevered member having a free end opposite first arm 236. Junction box assembly 210 may include a box. 242. Box 242 may be a junction box. For instance, box 242 may be configured to enclose the one or more electrical components (e.g., power cord) against bracket 212. Box 242 may be a malleable junction box. For instance, one or more sides (e.g., side walls, described below) may be malleable, bendable, or elastic such that they may deform under a load (e.g., squeezing) and return to shape upon release of the load. Box 242 may be selectively coupled to bracket 212. For instance, as will be described, box 242 may include one or more features configured to interact with each of first retention feature 218 and second retention feature 230.

Hereinafter, box 242 will be described in an installed or attached position. In detail, certain directions, orientations, or associations will be made as though box 242 is attached to bracket 212. It should be understood that box 242 may be removably attached to bracket 212. Box 242 may include a main plate 244. Main plate 244 may define a planar surface parallel to front planar surface 214 of bracket 212. In the attached position, main plate 244 may be spaced apart from front planar surface 214. Thus, an electronics cavity 254 may be defined between main plate 244 and front planar surface 214.

Box 242 may include a plurality of side plates extending from main plate 244. Each of the plurality of side plates may extend toward bracket 212 (e.g., toward front planar surface 214). The plurality of side plates may include a top plate 246, a bottom plate 248, a first lateral plate 250, and a second lateral plate 252. Top plate 246 may extend from a top edge of main plate 244. For instance, top plate 246 may extend toward front planar surface 214 of bracket 212. Similarly, bottom plate 248 may extend from a bottom edge of main plate 244 toward front planar surface 214 of bracket 212. As would be expected, first lateral plate 250 and second lateral plate 252 may extend from a first lateral edge and a second lateral edge, respectively, toward front planar surface 214 of bracket 212. Accordingly, each of main plate 244, top plate 246, bottom plate 248, first lateral plate 250, and second lateral plate 252 may define electronics cavity 254.

Top plate 246 may include a first side flap 256. First side flap 256 may extend toward first lateral plate 250. For instance, first side flap 256 may extend from a first lateral edge of top plate 246. First side flap 256 may extend predominantly downward (e.g., along the vertical direction V). First side flap 256 may at least partially overlap first lateral plate 250 along the lateral direction L. According to at least some embodiments, first side flap 256 is positioned on an outside of first lateral plate 250 (e.g., away from electronics cavity 254). First side flap 256 may extend for a predetermined distance. For instance, first side flap 256 may extend a predetermined percentage of a total length of first lateral plate 250. The predetermined percentage may be between about 5% and about 20% of the total length of first lateral plate 250.

Top plate 246 may include a second side flap 260. Second side flap 260 may extend toward second lateral plate 252. For instance, second side flap 260 may extend from a second lateral edge of top plate 246. Second side flap 260 may extend predominantly downward (e.g., along the vertical direction V). Second side flap 260 may at least partially overlap second lateral plate 252 along the lateral direction L. According to at least some embodiments, second side flap 260 is positioned on an outside of second lateral plate 252 (e.g., away from electronics cavity 254). Second side flap 260 may extend for a predetermined distance. For instance, second side flap 260 may extend a predetermined percentage of a total length of second lateral plate 252. The predetermined percentage may be between about 5% and about 20% of the total length of second lateral plate 252.

Bottom plate 248 may include a first side flap 258. First side flap 258 may extend toward first lateral plate 250. For instance, first side flap 258 may extend from a first lateral edge of bottom plate 248. First side flap 258 may extend predominantly upward (e.g., along the vertical direction V). First side flap 258 may at least partially overlap first lateral plate 250 along the lateral direction L. According to at least some embodiments, first side flap 258 is positioned on an outside of first lateral plate 250 (e.g., away from electronics cavity 254). First side flap 258 may extend for a predetermined distance. For instance, first side flap 258 may extend a predetermined percentage of a total length of first lateral plate 250. The predetermined percentage may be between about 5% and about 20% of the total length of first lateral plate 250.

Bottom plate 248 may include a second side flap 262. Second side flap 262 may extend toward second lateral plate 252. For instance, second side flap 262 may extend from a second lateral edge of bottom plate 248. Second side flap 262 may extend predominantly upward (e.g., along the vertical direction V). Second side flap 262 may at least partially overlap second lateral plate 252 along the lateral direction L. According to at least some embodiments, second side flap 262 is positioned on an outside of second lateral plate 252 (e.g., away from electronics cavity 254). Second side flap 262 may extend for a predetermined distance. For instance, second side flap 262 may extend a predetermined percentage of a total length of second lateral plate 252. The predetermined percentage may be between about 5% and about 20% of the total length of second lateral plate 252.

According to the design of box 242, each of first lateral plate 250 and second lateral plate 252 may be deformed (e.g., along the lateral direction L). For instance, first lateral plate 250 and second lateral plate 252 may be squeezed together along the lateral direction L. Thus, first lateral plate 250 may bend at a junction between main plate 244 and first lateral plate 250. Similarly, second lateral plate 252 may bend at a junction between main plate 244 and second lateral plate 252. As will be described, such deformation may improve an ability for box 242 to be assembled to bracket 212.

Box 242 may include a first tab 264. First tab 264 may extend from first lateral plate 250 (e.g., along the lateral direction L). Referring to FIG. 3, first tab 264 may be positioned at or near a vertical midpoint of first lateral plate 250. First tab 264 may define a length L1 (along the lateral direction L) and a height H1 (along the vertical direction V). First tab 264 may be configured to be accepted or selectively received within first receiving space 220 of first retention feature 218. As described above, as first lateral plate 250 is deformed along the lateral direction L, first tab 264 may be positioned such as to be slid into first receiving space 220. First tab 264 may include a screw hole 266 defined therethrough (e.g., along the transverse direction T). Screw hole 266 may be configured to be aligned with screw hole 216 in bracket 212 (e.g., when box 242 is in the installed position). Accordingly, a fastener may be used to secure box 242 (e.g., via first tab 264) to bracket 212 after first tab 264 is received within first receiving space 220.

Box 242 may include a second tab 268. Second tab 268 may extend from second lateral plate 252 (e.g., along the lateral direction L). Second tab 268 may extend in an opposite lateral direction from first tab 264. Referring to FIG. 3, second tab 268 may be positioned at or near a vertical midpoint of second lateral plate 252. Second tab 268 may define a length L2 (along the lateral direction L) and a height H2 (along the vertical direction V). Length L2 of second tab 268 may be less than length L1 of first tab 264. In some embodiments, height H2 of second tab 268 is approximately equal to height H1 of first tab 264. Second tab 268 may be configured to be accepted or selectively received within second receiving space 232 of second retention feature 230. As described above, as second lateral plate 252 is deformed along the lateral direction L, second tab 268 may be positioned such as to be slid into second receiving space 232.

As would be understood from the description above, first retention feature 218 may be positioned at a first lateral side of box 242 (e.g., adjacent to first lateral plate 250) and second retention feature 230 may be positioned at a second lateral side of box 242 (e.g., adjacent to second lateral plate 252). Thus, as box 242 is squeezed or deformed along the lateral direction L, distal ends of each of first tab 264 and second tab 268 may be positioned closer together to be easily accepted within first retention feature 218 and second retention feature 230, respectively. Advantageously, box 242 may be easily located with respect to bracket 212, enabling easy assembly in any positions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A domestic appliance defining a vertical direction, a lateral direction, and a transverse direction, the domestic appliance comprising:
   a frame comprising at least one frame member;
   a bracket attached to the at least one frame member, the bracket defining a front planar surface;
   a first retention feature protruding from the front planar surface of the bracket, the first retention feature forming a first receiving space;
   a second retention feature protruding from the front planar surface of the bracket and spaced apart from the first retention feature, the second retention feature forming a second receiving space; and
   a box selectively coupled to the bracket, the box comprising a first tab and a second tab, wherein the first tab is selectively received within the first retention feature and the second tab is selectively received within the second retention feature.

2. The domestic appliance of claim 1, wherein the box is a malleable junction box configured to enclose one or more electrical components therein against the bracket.

3. The domestic appliance of claim 1, wherein the box comprises:
   a main plate; and
   a plurality of side plates extending from the main plate toward the bracket; the plurality of side plates comprising a top plate, a bottom plate, a first lateral plate, and a second lateral plate.

4. The domestic appliance of claim 3, wherein the top plate comprises:
   a first side flap extending toward the first lateral plate, the first side flap overlapping the first lateral plate along the lateral direction; and
   a second side flap extending toward the second lateral plate, the second side flap overlapping the second lateral plate along the lateral direction, and wherein the bottom plate comprises:
   a third side flap extending toward the first lateral plate, the first side flap overlapping the first lateral plate along the lateral direction; and
   a fourth side flap extending toward the second lateral plate, the second side flap overlapping the second lateral plate along the lateral direction.

5. The domestic appliance of claim 3, wherein the first tab extends from the first lateral plate along the lateral direction and the second tab extends from the second lateral plate along the lateral direction opposite the first tab.

6. The domestic appliance of claim 1, wherein the first retention feature is positioned at a first lateral side of the box and the second retention feature is positioned at a second lateral side of the box.

7. The domestic appliance of claim 1, wherein the first retention feature comprises a first loop protruding from the bracket along the transverse direction, the first receiving space being formed between the first loop and the front planar surface, and wherein the second retention feature comprises a second loop protruding from the bracket along the transverse direction, the second receiving space being formed between the second loop and the front planar surface.

8. The domestic appliance of claim 1, wherein the first tab comprises a first aperture configured to receive a screw therethrough.

9. The domestic appliance of claim 1, wherein an extension length of the first tab along the lateral direction is greater than an extension length of the second tab along the lateral direction.

10. A junction box assembly for a domestic appliance, the junction box assembly defining a vertical direction, a lateral direction, and a transverse direction, the junction box assembly comprising:
    a bracket defining a front planar surface;
    a first retention feature protruding from the front planar surface of the bracket, the first retention feature forming a first receiving space;
    a second retention feature protruding from the front planar surface of the bracket and spaced apart from the first retention feature, the second retention feature forming a second receiving space; and
    a junction box selectively coupled to the bracket, the junction box comprising a first tab and a second tab, wherein the first tab is selectively received within the first retention feature and the second tab is selectively received within the second retention feature.

11. The junction box assembly of claim 10, wherein the junction box is a malleable junction box configured to enclose one or more electrical components therein against the bracket.

12. The junction box assembly of claim 10, wherein the junction box comprises:
    a main plate; and
    a plurality of side plates extending from the main plate toward the bracket; the plurality of side plates comprising a top plate, a bottom plate, a first lateral plate, and a second lateral plate.

13. The junction box assembly of claim 12, wherein the top plate comprises:
    a first side flap extending toward the first lateral plate, the first side flap overlapping the first lateral plate along the lateral direction; and
    a second side flap extending toward the second lateral plate, the second side flap overlapping the second lateral plate along the lateral direction, and wherein the bottom plate comprises:
    a third side flap extending toward the first lateral plate, the first side flap overlapping the first lateral plate along the lateral direction; and
    a fourth side flap extending toward the second lateral plate, the second side flap overlapping the second lateral plate along the lateral direction.

14. The junction box assembly of claim 12, wherein the first tab extends from the first lateral plate along the lateral direction and the second tab extends from the second lateral plate along the lateral direction opposite the first tab.

15. The junction box assembly of claim 10, wherein the first retention feature is positioned at a first lateral side of the junction box and the second retention feature is positioned at a second lateral side of the junction box.

16. The junction box assembly of claim 10, wherein the first retention feature comprises a first loop protruding from the bracket along the transverse direction, the first receiving space being formed between the first loop and the front planar surface, and wherein the second retention feature comprises a second loop protruding from the bracket along the transverse direction, the second receiving space being formed between the second loop and the front planar surface.

17. The junction box assembly of claim 10, wherein the first tab comprises a first aperture configured to receive a screw therethrough.

18. The junction box assembly of claim 10, wherein an extension length of the first tab along the lateral direction is greater than an extension length of the second tab along the lateral direction.

* * * * *